United States Patent
Marui et al.

(10) Patent No.: US 7,635,428 B2
(45) Date of Patent: Dec. 22, 2009

(54) HOLLOW FIBER MEMBRANE SUBMODULE AND MODULE INCLUDING THE SAME

(75) Inventors: Katsushige Marui, Iwakuni (JP); Hideto Kotera, Iwakuni (JP); Atsuo Kumano, Iwakuni (JP)

(73) Assignee: Toyo Boseki Kabushiki Kaisha, Osaka-Shi (JP)

( * ) Notice: Subject to any disclaimer, the term of this patent is extended or adjusted under 35 U.S.C. 154(b) by 460 days.

(21) Appl. No.: 10/567,162

(22) PCT Filed: Sep. 25, 2003

(86) PCT No.: PCT/JP03/12194

§ 371 (c)(1), (2), (4) Date: Mar. 14, 2006

(87) PCT Pub. No.: WO2005/011850

PCT Pub. Date: Feb. 10, 2005

(65) Prior Publication Data

US 2006/0151375 A1 Jul. 13, 2006

(30) Foreign Application Priority Data

Aug. 5, 2003 (JP) ............................. 2003-286733

(51) Int. Cl.
B01D 63/04 (2006.01)
B01D 63/02 (2006.01)
B01D 69/08 (2006.01)

(52) U.S. Cl. ................... 210/321.79; 210/321.8; 210/321.72; 210/321.88; 210/321.89; 96/6; 96/10

(58) Field of Classification Search .................. None
See application file for complete search history.

(56) References Cited

U.S. PATENT DOCUMENTS 3,928,204 A  12/1975  Thomas (Continued)

FOREIGN PATENT DOCUMENTS

EP  0873779 A2  10/1998

(Continued)

OTHER PUBLICATIONS

International Search Report for PCT/JP03/12194, Dec. 9, 2003.

(Continued)

*Primary Examiner*—Krishnan S Menon
(74) *Attorney, Agent, or Firm*—Kenyon & Kenyon LLP

(57) ABSTRACT

The present invention provides a hollow fiber membrane submodule comprising a hollow fiber membrane element, permeated fluid collectors, and snaps for securing the permeated fluid collectors to the hollow fiber membrane element, wherein the permeated fluid collectors are closely attached to the hollow fiber membrane element with the snaps in engagement therebetween and being arranged non-continuously around the outer periphery of each permeated fluid collector, and the permeated fluid collectors can be removed from and installed in the hollow fiber membrane element. With the hollow fiber membrane submodule of the present invention, when replacing the membranes, the hollow fiber membrane element is replaced with a new hollow fiber membrane element, and then the permeated fluid collectors can be reattached to the replaced element and reused. In addition, the snaps are capable of positioning the hollow fiber membrane element at the center of the hollow fiber membrane submodule within a pressure vessel, and also defining a flow path of a concentrated fluid with its non-continuous arrangement.

6 Claims, 8 Drawing Sheets

U.S. PATENT DOCUMENTS

| | | | |
|---|---|---|---|
| 4,080,296 A | | 3/1978 | Clark |
| 5,018,238 A | * | 5/1991 | Nelle .......................... 15/314 |
| 5,470,469 A | * | 11/1995 | Eckman ................... 210/321.8 |
| 6,149,817 A | | 11/2000 | Peterson |
| 6,183,639 B1 | * | 2/2001 | de Winter ................ 210/321.8 |
| 2002/0053540 A1 | * | 5/2002 | Collins et al. ............ 210/321.8 |
| 2003/0226798 A1 | * | 12/2003 | Hawkins et al. ............. 210/450 |

FOREIGN PATENT DOCUMENTS

| | | |
|---|---|---|
| EP | 1 310 291 A1 | 5/2003 |
| JP | 56-087405 | 7/1981 |
| JP | 58-163407 | 9/1983 |
| JP | 60-206415 | 10/1985 |
| JP | 2-100635 | 4/1990 |
| JP | 06-047259 A | 2/1994 |
| JP | 09-187626 | 7/1997 |
| JP | 9-511447 | 11/1997 |
| JP | 2000-262870 A | 9/2000 |
| JP | 20022292213 | 10/2002 |
| WO | 9608306 A1 | 3/1996 |

OTHER PUBLICATIONS

Supplementary Search Report issued Mar. 19, 2007 in EP03817793.7-2113, PCTJP0312194.

* cited by examiner

HOLLOW FIBER MEMBRANE SUBMODULE AND MODULE INCLUDING THE SAME

This is a 371 national phase application of PCT/JP2003/012194 filed 25 Sep. 2003, claiming priority to Japanese Application No. 2003-286733 filed 5 Aug. 2003, the contents of which are incorporated herein by reference.

TECHNICAL FIELD

The present invention relates to a hollow fiber membrane submodule for forming a hollow fiber membrane module comprising hollow fiber membranes having selective permeability. The present invention relates to a hollow fiber membrane module comprising hollow fiber membranes having selective permeability, the module being applicable to membrane separation treatment of fluids, such as, for example, desalination of sea water, desalination of brackish water, purification of wastewater, production of sterile water, production of ultrapure water, and like reverse osmosis processes; advanced water purification treatment, removal of low-molecular-weight toxic substances such as agricultural chemicals, odorants and disinfection by-product precursors, water softening treatment by removal of hardness constituents, and like nanofiltration processes; recovery of paint from electrodeposition coating wastewater, concentration and/or recovery of useful food-related materials, water purification treatment substituting for coagulation sedimentation and/or sand filtration, and like ultrafiltration processes; recovery of helium from natural gas, separation and/or recovery of hydrogen from the purge gases of ammonia plants, carbon dioxide separation in the tertiary recovery of petroleum, oxygen enrichment, nitrogen enrichment, and like gas separation processes; and other purposes. More specifically, the present invention relates to a hollow fiber membrane submodule for forming a reverse osmosis hollow fiber membrane module useful in water treatment such as desalination of sea water.

BACKGROUND ART

Membranes having selective permeability are classified according to the size of substances to be separated. For example, membranes for liquid treatment are generally classified into ultrafiltration and microfiltration membranes for separating substances such as colloids and proteins; nanofiltration membranes for separating low-molecular-weight organic substances such as agricultural chemicals; and reverse osmosis membranes for separating ions. Reverse osmosis membranes are used at pressures higher than the osmotic pressure of the liquid to be treated, and at pressures of several MPa in the case of seawater desalination.

Examples of the shapes of membranes having selective permeability include flat sheet membranes, tubular membranes, spiral wound membranes, and hollow fiber membranes. Among these examples, hollow fiber membranes provide a large membrane area per unit volume of membrane module, and are therefore suitable for membrane separation processes, thus finding wide application, for example, in the area of seawater desalination with reverse osmosis membranes. A hollow fiber membrane module typically comprises a pressure vessel, a hollow fiber membrane element, permeated fluid collectors for collecting the permeated fluid flowing through a plurality of hollow fiber membranes, and other components. It is particularly necessary that the hollow fiber membrane element and the permeated fluid collector be in close contact with each other. In the present invention, a hollow fiber membrane element having permeated fluid collectors closely affixed thereto is referred to as a hollow fiber membrane submodule.

Such a hollow fiber membrane submodule is useful when a plurality of hollow fiber membrane elements, particularly hollow fiber membrane elements of the type in which both ends open, are installed in a single pressure vessel, because it facilitates extraction of the permeated fluid from the open ends of the hollow fiber membranes.

In conventional hollow fiber membrane submodules, permeated fluid collectors are attached to a hollow fiber membrane element by bonding to achieve simple configuration and easy manufacture. For example, Japanese Unexamined Patent Publication No. 1997-511447 (Japanese translation of WO9608306) discloses a hollow fiber membrane submodule configuration comprising hollow fiber membranes both of whose ends are open, and permeated fluid collectors (end caps) attached to both open ends.

However, a problem with this hollow fiber membrane submodule is that because the permeated fluid collectors are attached to the hollow fiber membrane element by bonding or the like, the entire hollow fiber membrane submodule has to be replaced when replacing the membrane. Accordingly, the permeated fluid collectors are also disposed and replaced, and thus cannot be reused, which is disadvantageous in terms of ecology and cost efficiency. Moreover, because the permeated fluid collectors are not removable, if the submodule proves to be defective after performance evaluation, the open surfaces of the hollow fiber membranes cannot be tested and/or examined for leaks, or cannot be repaired. In addition, with a large hollow fiber membrane element, direct installation of permeated fluid collectors or end caps into the element is difficult. Furthermore, upon installation of the element in a pressure vessel, a space must be provided between the inner surface of the pressure vessel and the hollow fiber membrane submodule for the feed or concentrated fluid to pass through, and therefore the outside diameter of the hollow fiber membrane element has to be made small. This results in reduction in the membrane area of the hollow fiber membranes and accompanying reduction in the flow of permeated fluid.

Alternatively, permeated fluid collectors may be fastened to a hollow fiber membrane element using screws. This configuration enables collectors to be removed from and installed in the element. The disadvantage of this configuration, however, is that during membrane treatment operation, the screws may become loose by the vibration of the pump feeding a feed fluid to the hollow fiber membrane submodule. Moreover, although metal is a preferable material for the screws of this configuration, the metal is subjected to corrosion in treating such liquids as seawater, and therefore is not preferable.

DISCLOSURE OF THE INVENTION

An object of the present invention is to provide a hollow fiber membrane submodule comprising a hollow fiber membrane element and permeated fluid collectors, wherein the permeated fluid collectors are closely attached to the hollow fiber membrane element during use of the hollow fiber membrane submodule and can also be removed and attached, and when replacing the membranes, the hollow fiber membrane element is replaced with a new hollow fiber membrane element, and then the permeated fluid collectors can be reattached to the replaced element and reused.

As a result of extensive research to overcome the aforementioned prior art problems, the present inventors found that both features of the above-mentioned object can be accomplished by securing permeated fluid collectors to a hollow fiber membrane element with removable snaps that engages the permeated fluid collectors and the hollow fiber membrane element.

The present invention is summarized as follows.

(1) A hollow fiber membrane submodule comprising a hollow fiber membrane element having a feed fluid inlet, a feed fluid distribution pipe in communication with the feed fluid inlet, and an assembly of hollow fiber membranes having selective permeability and disposed around the feed fluid distribution pipe, wherein both ends of the hollow fiber membrane assembly are separately fixed with resin, and at least one end of the hollow fiber membrane assembly is subsequently cut to hollow out the hollow fiber membranes; and permeated fluid collectors for collecting permeated fluid flowing from the opening(s) of the hollow fiber membranes, the permeated fluid collectors being secured to the hollow fiber membrane element with removable snaps in a non-continuous manner.

(2) The hollow fiber membrane submodule according to Item (1), wherein the hollow fiber membranes having selective permeability are arranged in a crisscross fashion around the feed fluid distribution pipe in communication with the feed fluid inlet.

(3) The hollow fiber membrane submodule according to Item (1) or Item (2), wherein the hollow fiber membranes are reverse osmosis membranes.

(4) The hollow fiber membrane submodule according to any of Items (1), (2) and (3), wherein the snaps are made of resin.

(5) The hollow fiber membrane submodule according to any of Items (1) to (4), wherein the snaps have an impact strength of not less than 2.5 kg-cm/cm, a bending elasticity coefficient of 10,000 to 200,000 kg/cm$^2$, and a tensile strength of not less than 400 kg/cm$^2$.

(6) A hollow fiber membrane module comprising two or more of the hollow fiber membrane submodules according to any of Items (1) to (5) in a pressure vessel.

As used herein, the expression that the hollow fiber membranes for forming the hollow fiber membrane assembly are arranged in a crisscross fashion around the feed fluid distribution pipe means that the hollow fiber membranes are arranged around the feed fluid distribution pipe so as to cross one another such that the hollow fiber membranes have a winding angle with respect to the axial direction of the feed fluid distribution pipe. The crisscross arrangement of the hollow fiber membranes can be achieved by, for example, rotating the feed fluid distribution pipe to wind a hollow fiber membrane or a bundle of a plurality of hollow fiber membranes while causing the membrane or bundle to traverse in the axial direction of the feed fluid distribution pipe. The winding angle represents the angle of the hollow fiber membranes with respect to the axial direction of the feed fluid distribution pipe. This angle may differ between an inner layer portion and an outer layer portion of the hollow fiber membrane assembly. For example, the winding angle of an outermost layer portion is preferably from 5 to 70 degrees, more preferably from 15 to 50 degrees. If this angle is too small, the hollow fiber membranes or bundle of hollow fiber membranes can easily collapse during winding. Moreover, if the angle is too small, it is difficult to ensure spaces among the hollow fiber membranes, and the essential effect of the crisscross arrangement may not be fully achieved. Conversely, if the angle is too large, the length of the hollow fiber membranes across the opening(s) becomes too long, resulting in a great loss of fluid pressure. This may cause a reduction in the effective differential pressure and degradation of the permeation and separation performances.

The feed fluid distribution pipe according to the invention is a tubular member which serves to distribute the fluid fed through the feed fluid inlet to the hollow fiber membrane assembly. Preferable examples include a perforated pipe. The use of the feed fluid distribution pipe allows the feed fluid to be uniformly distributed to the hollow fiber membrane assembly. Such an effect is particularly noticeable when the hollow fiber membrane element has a long length or the hollow fiber membrane assembly has a large outside diameter. In the present invention, the feed fluid distribution pipe is preferably positioned at the center of the hollow fiber membrane assembly. If the diameter of the feed fluid distribution pipe is too large for the diameter of the hollow fiber membrane element, the ratio of the hollow fiber membranes in the module decreases, resulting in a reduction in the area of membranes in the module and an accompanying reduction in the amount of treatment. Conversely, if the diameter of the feed fluid distribution pipe is too small, this causes a great loss in the pressure created by the feed fluid flowing through the feed fluid distribution pipe. Consequently, the effective differential pressure applied to the hollow fiber membranes decreases to reduce the amount of permeated water. Moreover, if the diameter is too small, the feed fluid distribution pipe may be damaged by the tensile stress applied to the hollow fiber membranes when the feed fluid flows through the layers of hollow fiber membranes. Thus, an optimum diameter of the feed fluid distribution pipe is preferably established by taking into account all of these influences. For example, when the outside diameter of the hollow fiber membrane layers of the hollow fiber membrane element is about 260 mm, the outside diameter of the feed fluid distribution pipe is preferably from 50 to 90 mm, and more preferably from 60 to 80 mm. The inside diameter of the feed fluid distribution pipe is preferably from 45 to 85 mm, and more preferably from 55 to 75 mm. When the feed fluid distribution pipe is made of fiberglass-reinforced plastic, the thickness of the pipe is preferably from 1 to 7 mm, and more preferably from 2 to 5 mm.

In the present invention, the expression that both ends of the hollow fiber membrane assembly of the invention are separately fixed with resin, and at least one end of the hollow fiber membrane assembly is subsequently cut to hollow out the hollow fiber membranes means that both ends of the hollow fiber membrane assembly are separately fixed and hermetically sealed with an adhesive resin by potting or the like, so as to prevent leakage of the feed fluid from the spaces among the hollow fiber membranes or spaces among the hollow fiber membranes and resin. The adhesive resin used is preferably selected from epoxy resins, urethan resins, silicon resins and the like according to the properties of the fluid to be treated and the conditions of use. The ends of the hollow fiber membrane assembly fixed with an adhesive are opened by cutting or other process such that the hollow fiber membranes are hollowed out, so as to form a hollow fiber membrane element. One or a plurality of hollow fiber membrane submodules are installed in a pressure vessel having a feed fluid inlet, a concentrated fluid outlet, and a permeated fluid outlet, thus forming a hollow fiber membrane module.

The hollow fiber membrane submodule according to the present invention comprises such members as permeated fluid collectors attached to a hollow fiber membrane element, so as to enable collection and extraction of the permeated fluid flowing through the open end(s) of the hollow fiber membranes. A hollow fiber membrane element in which only one end is open comprises a permeated fluid collector attached to that end to form a hollow fiber membrane submodule. In this configuration, the other end of the element is preferably sealed against the permeated fluid collector at the end of the pressure vessel by utilizing operating pressure. A hollow fiber membrane element in which both ends are open comprises permeated fluid collectors attached to both ends to form a hollow fiber membrane submodule. When both ends of the element are open, it is preferable to use an internal pipe connected to and communicating with the permeated fluid collectors on both ends to extract the permeated fluid through a single outlet from the openings in the ends of the hollow fiber membranes. Two or more hollow fiber membrane elements in which both ends are open may be installed in a single pressure vessel. When the open ends of the hollow fiber membrane elements are positioned distant from the inside ends of the pressure vessel, it is preferable to install a completed hollow fiber membrane submodule having permeated fluid collectors at the open ends of each hollow fiber membrane element. This enables the permeated fluid to be extracted without being contaminated by the feed fluid and the like. In the present invention, one or more hollow fiber membrane submodules are installed in a pressure vessel having a feed fluid inlet, a concentrated fluid outlet, and a permeated fluid outlet, so as to form a hollow fiber membrane module. It is preferable to secure permeated fluid collectors in a removable manner to a hollow fiber membrane element rather than to secure the permeated fluid collectors to the hollow fiber membrane element by bonding, which would make the installation and removal thereof difficult. The former method facilitates membrane replacement, performance tests and repair of open end surfaces.

The pressure vessel according to the present invention which houses one or more hollow fiber membrane submodules is preferably capable of applying an effective differential pressure to the hollow fiber membranes and is also capable of separation using the hollow fiber membranes. In addition, the pressure vessel preferably has no leakage of fluid outside, and provides flow paths for the feed fluid, permeated fluid and concentrated fluid, respectively, with the spaces on the feed side and permeation side as well as the spaces on the permeation side and concentration side being strictly separated from one another. The feed fluid inlet, concentrated fluid outlet and permeated fluid outlet may be disposed in any positions, but they are preferably located near an end of the pressure vessel for convenience of operation and efficiency of use. When a plurality of hollow fiber membrane submodules are installed, a plurality of permeated fluid outlets are preferably provided so as to enable separate extraction of permeated fluids from the respective submodules for facilitating control of the operation of the membrane submodules. For example, when two membrane submodules are housed in a pressure vessel, a feed fluid inlet may be disposed near the center of one end of the pressure vessel, two permeated fluid outlets may be disposed in any positions at both ends of the pressure vessel except the central portions thereof, and a concentrated fluid outlet may be disposed on a side wall near the center of the other end of the pressure vessel.

The snaps according to the present invention are members for use in securing a permeated fluid collector to an end of the hollow fiber membrane element in engagement therebetween, and are arranged non-continuously around the outer peripheral surface, so as to allow the permeated fluid collector to be installed in, removed from, and secured to the hollow fiber membrane element. The expression "in engagement therebetween" refers to the state in which a projection on one end of a snap is engaged in a depression provided in the end of the hollow fiber membrane element, and a projection on the other end of the snap is engaged in a depression provided in the permeated fluid collector. The snap is engaged in such a manner that it will not fall off by itself unless a force is externally applied to remove the snap.

Each snap preferably has a large impact strength and an appropriate elasticity coefficient to facilitate attachment and removal while exhibiting durability to withstand repeated attachment and removal. In addition, the snap is preferably made of a strong material to endure the operation of the membrane module while exhibiting the durability to withstand repeated attachment and removal. Each snap preferably has an impact strength of, e.g., not less than 2.5 (kg·cm/cm), and more preferably not less than 3 (kg·cm/cm), as measured by tests according to ASTM D256. With regard to the elasticity coefficient, each snap preferably has a bending elasticity coefficient of, e.g., 10,000 to 200,000 (kg/cm$^2$), and more preferably a bending elasticity coefficient of 20.000 to 100.000 (kg/cm$^2$), as measured by tests according to ASTM D790. With regard to strength, each snap preferably has a tensile strength of, e.g., not less than 400 (kg/cm$^2$), and more preferably a tensile strength of not less than 500 (kg/cm$^2$), as measured by tests according to ASTM D638. Materials failing to fall within these ranges cannot be easily attached and removed, and the snap may be fractured during engagement into the depression. Furthermore, when back pressure is applied during operation, the snap may be subjected to tensile stress and fractured. For these reasons, resins can be mentioned as examples of preferred materials. Examples of resins include thermoplastic resins, thermosetting resins, and reinforced plastics with such resins and fibers. Specific examples include vinyl chloride resins, polypropylene resins, polyethylene resins, polyacetal resins, polysulfone resins, polyimide resins, polyamide resins, polybutylene terephthalate resins, ABS resins, epoxy resins, polycarbonate resins, polyether ether ketone resins, and the like. The above-mentioned resins are not subjected to corrosion even in contact with sea water, etc., and are also preferable in terms of strength, light weight, and low cost. Particularly preferable snap materials are vinyl chloride resins, polyacetal resins, polyamide-imide resins, fiber-reinforced polyamide resins, and the like.

The snap may have any shape as long as it is capable of securing a permeated fluid collector to a hollow fiber membrane element in engagement therebetween. FIG. 4 illustrates an example of the engagement of a snap, and an example of the relationship between a permeated fluid collector and a hollow fiber membrane element. Although the ends of the snap may have any shape as long as the engagement can be achieved and the snap does not fall off by itself, the snap preferably has, for example, an angle θ17-1 on the permeated fluid collector side and an angle θ17-2 on the hollow fiber membrane element side of 90 degrees or less. Preferably, one of those angles is less than 90 degrees, and the other is 90 degrees for achieving easy attachment and removal. Preferably, the angle θ17-1 is substantially equal to an angle θ6 of a snap groove provided in the permeated fluid collector, and the angle θ17-2 is substantially equal to an angle θ4 of a snap groove provided in the hollow fiber membrane element. The snap need not have a linear configuration, and some portions of the snap preferably have a curved-surface configuration to avoid stress concentration. Similarly, a length L17-1 of the snap projection on the permeated fluid collector side is preferably less than a depth L6 of the snap groove provided in the permeated fluid collector, and a length L17-2 of the snap projection on the hollow fiber membrane element side is preferably less than a depth L4 of the snap groove in the hollow fiber membrane element. If these lengths are greater than the respective depths, fixation by the snap may become unstable. Preferably, a distance W17 between the snap projections is substantially equal to a distance W64 between the snap grooves in the permeated fluid collector and the hollow fiber membrane element. If the distance W17 is too long, the snap may fall off by itself, whereas if the distance W17 is too short, the snap may not be easily removed. The distance W64 represents a value before the deformation of an O-ring 15 by the application of operating pressure. Upon deformation of the O-ring by pressure, a distance W15 between the permeated fluid collector and the hollow fiber membrane element becomes a minimum, possibly nearly zero. The projections and grooves therefore preferably have such a relationship that the snap may not fall off by itself even when the distance W15 is minimized. Furthermore, during this application of pressure, the distance W64 between the respective snap grooves in the permeated fluid collector and the hollow fiber membrane element also decreases. Therefore, in order to prevent compressive stress from being applied to the snap between these grooves in such a situation, the width W4 of the groove in the hollow fiber membrane element and/or the width W6 of the groove in the permeated fluid collector is preferably set to be somewhat large by allowing for the reduction in the distance W64. The width W4 is preferably from 1.0 to 1.3 times greater than the axial thickness W17-2 of the projection inserted into the groove in the hollow fiber membrane element, and more preferably from 1.1 to 1.2 times larger than the thickness W17-2. This facilitates attachment and removal of the snap while making the snap unlikely to fall off by itself. Note, however, that the difference between the width W4 and the thickness W17-2 is preferably greater than the amount of change caused by the deformation of the O-ring by pressure. Similarly, the width W6 is preferably equal to or greater than the axial thickness W17-1 of the snap projection inserted into the groove in the permeated fluid collector. When the snap has the shape shown in FIG. 4 and an angle θ17-1 on the permeated fluid collector side of 90 degrees, the width W6 is preferably equal to the thickness W17-1. Although in this example, the angle θ17-1 of the permeated fluid collector side of the snap is illustrated to be 90 degrees, the angle θ17-2 of the hollow fiber membrane element side may alternatively be made 90 degrees.

The width and thickness of each snap are preferably established by taking into account the total snap cross-sectional area determined by the cross sectional area of each snap perpendicular to the axis of the hollow fiber membrane element and the number of snaps; the physical values (such as strength, etc.) of the snap; the force expected to act on the snap during operation; and the safety factor of the snap. The width of each snap is preferably such that the cross sectional area of the snap determined by the thickness of the snap multiplied by the tensile strength of the snap material is greater than the design load expected to be applied to the snap multiplied by the safety factor of the snap. The safety factor of the snap is preferably not less than two, and more preferably not less than three. Here, the design load expected to be applied to the snap represents a tensile load. For example, in the case of seawater desalination using reverse osmosis membranes, pressure is expected to be created by the permeated fluid flowing in the permeated fluid collectors when the operation has stopped. The design load can be determined by multiplying this pressure by the pressure receiving area of the snap. The thickness and width of the snap are preferably set so as to fall within the aforementioned ranges, further in consideration of usability and the distance of the space between the snap and the inner surface of the pressure vessel. In the present invention, the thickness of each snap is preferably from 1 to 7 mm, and more preferably from 2 to 5 mm. The width of each snap is preferably 1/(several to several tens) of the outer peripheral length of a permeated fluid collector. For example, when the diameter of the permeated fluid collector is 280 mm, the width of the snap is preferably from 10 to 150 mm, and more preferably 20 to 100 mm.

As used herein, the expression that the snaps are non-continuously arranged around the outer periphery means that the snaps are present in some regions of the outer periphery but are absent in other regions, and does not refer to the state where the snaps are arranged all around the outer periphery. The regions of the snaps serve to secure the hollow fiber membrane element at a central position within the pressure vessel, whereas the regions without a snap serve to ensure a flow path through which the concentrated fluid passes. The ratio of the snaps in the outer periphery of the permeated fluid collector is preferably not less than 10% and not more than 60%, and more preferably not less than 30% and not more than 50%. If this ratio is too large, the volumes of the flow paths for the feed fluid and concentrated fluid become small, resulting in increases in the pressure loss with an accompanying reduction in the flow of permeated fluid. Conversely, if the ratio of the snaps is too small, the snaps may be damaged because of their low strength. Furthermore, because these snaps lack the strength for securing the permeated fluid collector, the permeated fluid may leak or mix with the concentrated fluid.

A preferred snap arrangement is such that a plurality of snaps are positioned substantially in a symmetrical fashion for maintaining a balance and facilitating the positioning of the hollow fiber membrane element at the center of the pressure vessel. The number of snaps is not particularly limited; however, an excess number of snaps makes it troublesome to attach and remove the snaps, whereas too small a number requires the size of the snaps themselves be increased, thus making it difficult to attach and remove them. Therefore, the number of snaps is preferably from 3 to 16, and more preferably from 4 to 10.

The permeated fluid collector according to the present invention is a member for use in collecting the permeated fluid flowing out from an open end of the hollow fiber membrane element, so as to ensure a flow path in the hollow fiber membrane opening. Depending on the configuration of the hollow fiber membrane element, the permeated fluid collector may serve to receive pressure applied to an end of the element. Although the shape of the permeated fluid collector is not particularly limited, it is preferably such that a space is provided so as not to block the opening of the hollow fiber membranes for collecting the permeated fluid. For example, the permeated fluid collector may comprise triangular grooves concentrically provided in its surface in contact with the open end of the hollow fiber membrane element. The triangular grooves have peaks for withstanding the pressure at the open end and troughs for defining a flow path for the permeated fluid. The area of the peaks in contact with the open end is preferably small so as not to restrict the flow of the permeated fluid from the open end of the hollow fiber membranes, but if the contact area is too small, the peaks may not withstand the pressure. Therefore, the ratio of the area of the peaks to the area of the open end of the hollow fiber membrane element is preferably from 0.1 to 2%, and more preferably 0.2 to 1%. Although the permeated fluid collector may be made of any suitable material, it is preferably made of resin so as to provide the necessary chemical stability, cost efficiency, strength, and elasticity. Preferred examples include polyacetal, vinyl chloride and the like. The permeated fluid collector may be made of the same material as that of the snaps. The space between the permeated fluid collector and the pressure vessel defines a flow path for the concentrated fluid, and therefore, a space is preferably provided between the outer surface of the permeated fluid collector and the inner surface of the pressure vessel with such a size as to prevent excess pressure losses when the concentrated fluid passes therethrough. For example, in the case of seawater desalination using a reverse osmosis membrane module, the distance between the outer surface of the permeated fluid collector and the inner surface of the pressure vessel is preferably from 1 to 10 mm, and more preferably 2 to 8 mm.

Examples of hollow fiber membranes having selective permeability according to the present invention include microfiltration membranes, nanofiltration membranes, and reverse osmosis membranes. The hollow fiber membranes of the invention are particularly useful in reverse osmosis hollow fiber membrane modules which are used in, e.g., the desalination of seawater.

In the present invention, the hollow fiber membranes are preferably reverse osmosis membranes. Reverse osmosis membranes are separation membranes which filter out impurities having molecular weights of several tens of daltones, and are capable of removing 90% or more of contained salt at operating pressures of 0.5 MPa or higher. Since the hollow-fiber type reverse osmosis membranes used in seawater desalination operate at high pressures, they typically have a small diameter, and tend to result in a great pressure loss for the fluid inside the hollow portion. Also, the seawater to be treated has high turbidity, and therefore, the hollow fiber membranes preferably have a configuration such that the membranes are not plugged up, making them an example of a configuration for achieving the effects of the present invention.

In the present invention, the inside diameter of the hollow fiber membranes is preferably established in consideration of the hollow ratio determined by the inside and outside diameters of the hollow fiber membranes. The optimum inside diameter varies depending on the working pressure. For example, in the case of high-pressure operation for seawater desalination or the like by reverse osmosis, the inside diameter of the hollow fiber membranes is preferably from 30 to 200 µm, and more preferably from 40 to 150 µm. If the inside diameter is too small, the pressure loss of the fluid inside the hollow portion increases to reduce the amount of permeated water. Conversely, if it is too large, the diameter of the hollow fiber membranes itself becomes large, resulting in a small membrane area per volume and an accompanying reduction in the amount of treatment.

The hollow fiber membrane module according to the present invention comprising two or more hollow fiber membrane submodules in a pressure vessel refers to the state in which each of the hollow fiber membrane submodules is installed so as to provide communication among the feed fluid, permeated fluid and concentrated fluid. The installation of two or more hollow fiber membrane submodules in a single pressure vessel is preferable, because it reduces the cost of pressure vessel per hollow fiber membrane submodule while reducing the number of pipes for connecting the membrane modules, resulting in less space per hollow fiber membrane submodule. The number of hollow fiber membrane submodules which can be housed in a single pressure vessel is not particularly limited. For example, with reverse osmosis membranes for use in seawater desalination, six or fewer submodules are preferably used. If too many submodules are used, the flow path through which the permeated fluid exits from the pressure vessel becomes too long, resulting in increased pressure loss with an accompanying reduction in the flow of permeated fluid. Moreover, the installation and removal of the submodules becomes difficult.

A plurality of hollow fiber membrane submodules are preferably connected in parallel when the recovery rate, i.e., the ratio of the flow rate of permeated fluid to the flow rate of feed fluid fed to the hollow fiber membrane module, is low, or when the pressure loss across the membrane module should be reduced. In parallel connection, the feed fluid is fed in parallel to each of the hollow fiber membrane submodules. The composition and concentration of the feed fluid fed to each hollow fiber membrane submodule are basically the same. This configuration accordingly allows uniform distribution of the load applied to each of the hollow fiber membrane submodules, thereby preventing the load from being concentrated on a particular submodule. Furthermore, the flow rate of the fluid fed to each hollow fiber membrane submodule is low, so that pressure loss across the module can be kept low to ensure an effective differential pressure.

A plurality of hollow fiber membrane submodules are preferably connected in series when the recovery rate is high, or when the concentrations of permeated fluids from the respective hollow fiber membrane submodules should be different. In serial connection, a feed fluid is fed to each of the hollow fiber membrane submodules sequentially from an upstream submodule's feed side and concentration side to a downstream submodule's feed side and concentration side within a single pressure vessel. The composition and flow rate of the feed fluid basically vary in each hollow fiber membrane submodule. As the feed fluid travels to the downstream submodule, the concentration of non-permeated constituents, i.e., constituents to be removed, in the feed fluid increases, and the flow rate decreases. Accordingly, the permeated fluids obtained from the respective hollow fiber membrane submodules usually differ in flow rate and concentration, depending on the operating conditions of the hollow fiber membrane module and the recovery rate in particular. A hollow fiber membrane submodule situated closer to the concentration side has a lower flow rate of the permeated fluid, with an increase in the concentration of non-permeated constituents, i.e., constituents to be removed from the feed fluid. The permeated fluids obtained from the respective hollow fiber membrane submodules have different concentrations, so that overall optimization can be achieved by, for example, post-treating only the permeated fluid from the hollow fiber membrane submodule having a high concentration of the permeated fluid. Moreover, in such a serial connection, the flow rate of the feed fluid fed to each hollow fiber membrane submodule is high, and accordingly the flow velocity of the feed fluid on the hollow fiber membrane surfaces is great even at a high recovery rate. This effectively prevents concentration polarization and the adherence of contaminants to the membrane surfaces.

Figure 1:
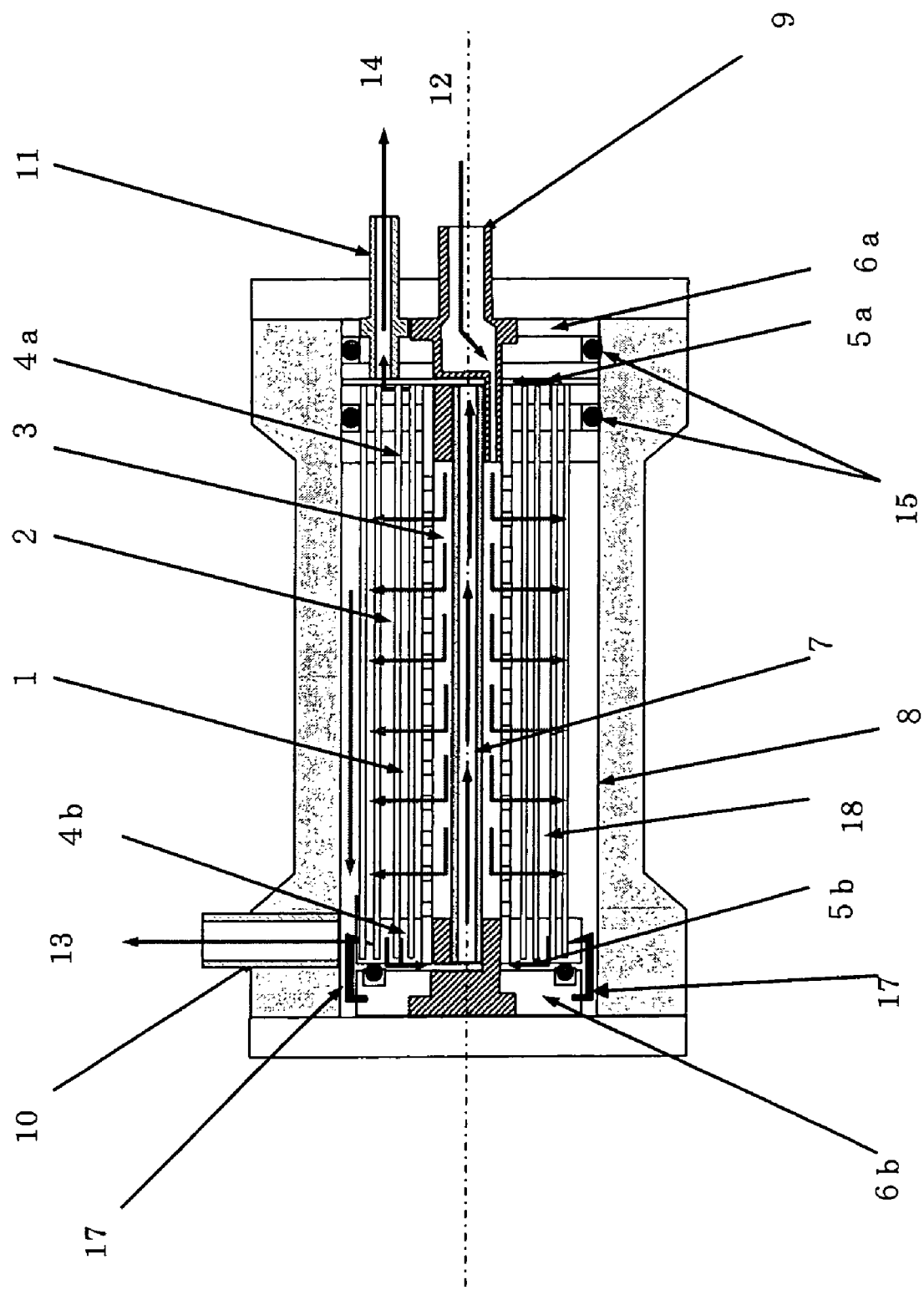
FIG. 1

A simple structural diagram illustrating an example of a hollow fiber membrane module of the present invention comprising a single hollow fiber membrane submodule having a permeated fluid collector secured to one end only.

FIG. 2

A simple structural diagram illustrating an example of a hollow fiber membrane submodule of the present invention having a permeated fluid collector secured to one end only.

FIG. 3

A simple structural diagram illustrating an end face of an example of a hollow fiber membrane submodule of the present invention which is perpendicular to the axial direction for use in illustrating the relationship between a hollow fiber membrane opening, snaps, and a pressure vessel.

FIG. 4

A schematic diagram illustrating the engagement of a snap between an end of a hollow fiber membrane element and a permeated fluid collector in one example of a hollow fiber membrane submodule of the present invention.

FIG. 5

A simple structural diagram illustrating an example of a hollow fiber membrane module of the present invention comprising two hollow fiber membrane submodules in a pressure vessel, each of which has a permeated fluid collector secured to one end only.

FIG. 6

A simple structural diagram illustrating an example of a hollow fiber membrane submodule of the present invention having permeated fluid collectors secured to both ends.

FIG. 7

A simple structural diagram illustrating an example of a hollow fiber membrane module of the present invention comprising two hollow fiber membrane submodules in a pressure vessel, each of which has permeated fluid collectors secured to both ends.

FIG. 8

A simple structural diagram illustrating an example of a snap of the present invention.

EXPLANATION OF LETTERS AND NUMERALS 1, 1': Hollow fiber membrane submodules
2, 2': Hollow fiber membranes
3, 3': Feed fluid distribution pipes
4a, 4b, 4a', 4b': Resin
5a, 5b, 5a', 5b': Hollow fiber membrane openings
6a, 6b, 6a', 6b': Permeated fluid collectors
7, 7': Internal pipes
8: Pressure vessel
9, 9': Feed fluid inlets
10, 10': Concentrated Fluid outlets
11, 11': Permeated fluid outlets
12, 12': Feed fluids
13, 13': Concentrated fluids
14, 14': Permeated fluids
15: O-rings
16: Intermediate connector
17: Snaps
18, 18': Hollow fiber membrane elements
19: Packings
20: Snap groove in permeated fluid collector
21: Snap groove in hollow fiber membrane element
L4: Depth of snap groove in hollow fiber membrane element
L6: Depth of snap groove in permeated fluid collector
L17-1: Length of snap projection on permeated fluid collector side
L17-2: Length of snap projection on hollow fiber membrane element side.
W4: Width of snap groove in hollow fiber membrane element
W6: Width of snap groove in permeated fluid collector
W15: Distance between permeated fluid collector and hollow fiber membrane element
W17: Distance between snap projections
W17-1: Axial thickness of snap projection inserted into groove on permeated fluid collector side
W17-2: Axial thickness of snap projection inserted into groove on hollow fiber membrane element side
W64: Distance between snap grooves of permeated fluid collector and hollow fiber membrane element θ4: Angle of snap groove in hollow fiber membrane element
θ6: Angle of snap groove in permeated fluid collector
θ17-1: Angle of permeated fluid collector side of snap
θ17-2: Angle of hollow fiber membrane element side of snap

BEST MODE FOR CARRYING OUT THE INVENTION

EXAMPLES

The present invention is further illustrated by the following Examples, which are not intended to limit the scope of the disclosure. The Examples illustrate cases of reverse osmosis membranes for seawater desalination.

A hollow fiber membrane submodule 1 according to one embodiment of the invention comprises hollow fiber membranes 2 having selective permeability disposed around a feed fluid distribution pipe 3, and has its both ends fixed with resin 4a, 4b. Each end of a hollow fiber membrane element is provided with a hollow fiber membrane opening 5a and 5b, respectively. A permeated fluid collector 6b is secured to the hollow fiber membrane opening 5b with snaps 17 in engagement therebetween, and a permeated fluid collector 6a comes into contact by pressure with the other hollow fiber membrane opening 5a in a pressure vessel. The permeated fluid is collected in these permeated fluid collectors. The permeated fluid at one end is caused to pass through an internal pipe 7 and is collected in the permeated fluid collector 6a at the other end.

The hollow fiber membrane submodule 1 is housed in a tubular pressure vessel 8 which is provided with a feed fluid inlet 9, a concentrated fluid outlet 10, and a permeated fluid outlet 11.

Feed fluid 12 enters through the feed fluid inlet 9, and is fed to the hollow fiber membranes 2 outwardly in the circumferential direction while passing through the feed fluid distribution pipe 3. Part of the fluid permeates the hollow fiber membranes 2 and flows from the hollow fiber membranes 5a, 5b via the permeated fluid collectors 6a, 6b and internal pipe 7, so as to exit from the permeated fluid outlet 11 as permeated fluid 14. Concentrated fluid which does not permeate the hollow fiber membranes 2 passes through a flow path between the hollow fiber membrane submodule 1 and the pressure vessel 8, so as to exit from the concentrated fluid outlet 10 as concentrated fluid 13. The concentrated fluid is sealed in with O-rings 15 so that it does not mix with the permeated fluid.

Figure 2:
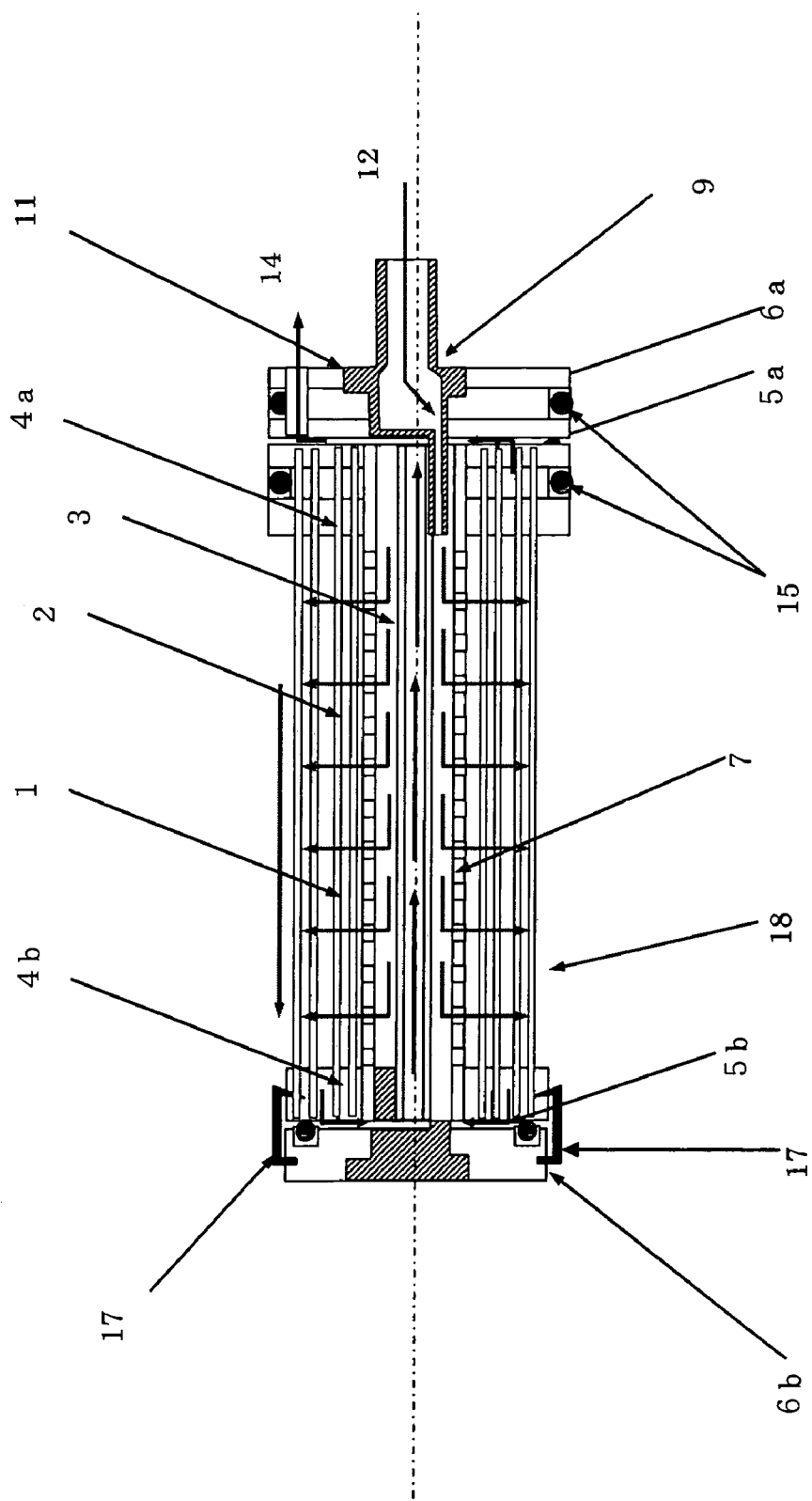

FIG. 2 shows an example of a hollow fiber membrane submodule according to the present invention having a permeated fluid collector 6b secured to one end only. The hollow fiber membrane module shown in FIG. 2 is the same type as the module shown in FIG. 1. In this example, the permeated fluid collector 6b is secured to the hollow fiber membrane opening 5b only at one end of the hollow fiber membrane element 18 with snaps 17 in engagement therebetween.

Figure 3:
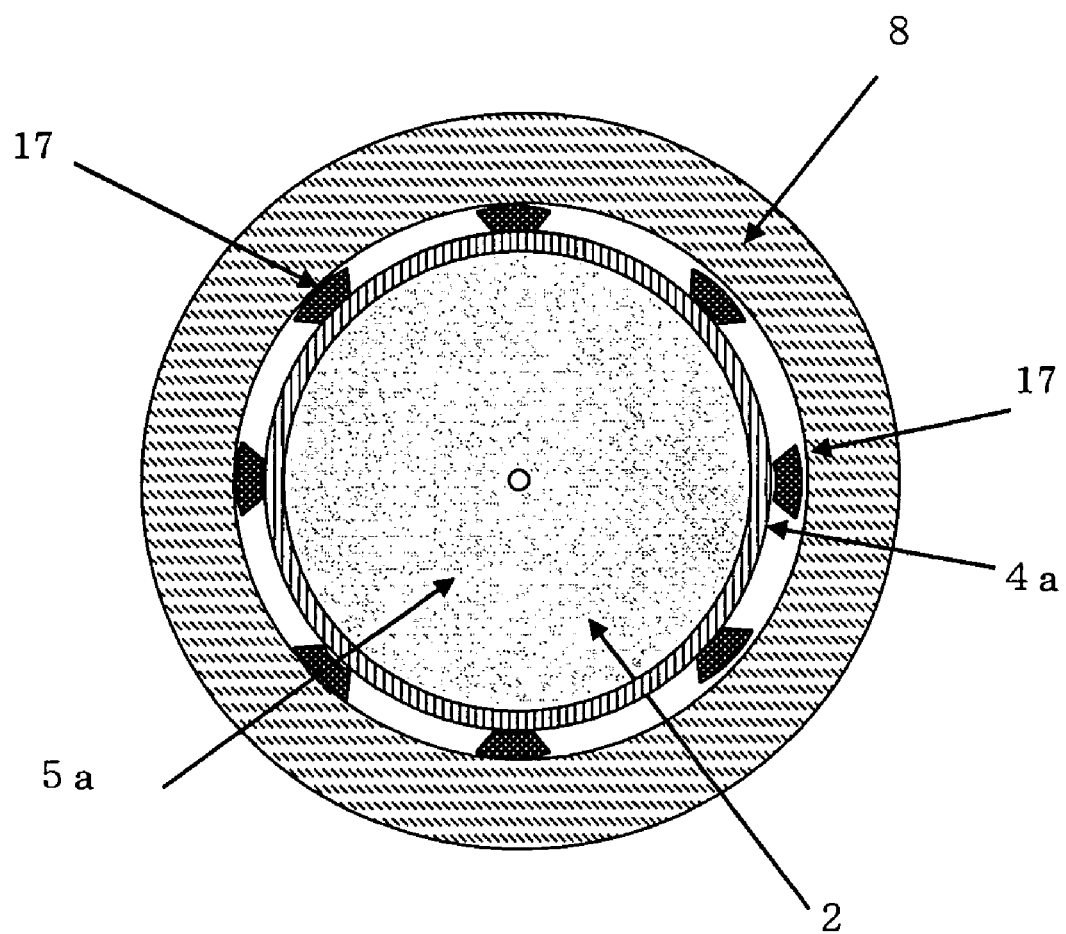

FIG. 3 schematically illustrates a simple cross section of an end face of an example of a hollow fiber membrane submodule of the present invention taken perpendicular to the axial direction for use in illustrating the relationship between the hollow fiber membrane opening 5a, snaps 17, and pressure vessel B. In this example, eight snaps 17 are substantially equally spaced around the outer periphery of the resin 4a at one open end of a hollow fiber membrane element in a symmetrical fashion. These snaps 17 not only serve to secure the permeated fluid collector to the resin 4a at the end of the hollow fiber membrane element in engagement therebetween, but also permit the hollow fiber membrane submodule to be positioned substantially at the center of the pressure vessel. Furthermore, since the snaps 17 are arranged non-continuously, regions without a snap 17 define a space between the hollow fiber membrane submodule and the inside of the pressure vessel, so as to ensure the flow path of the concentrated liquid.

Figure 4:
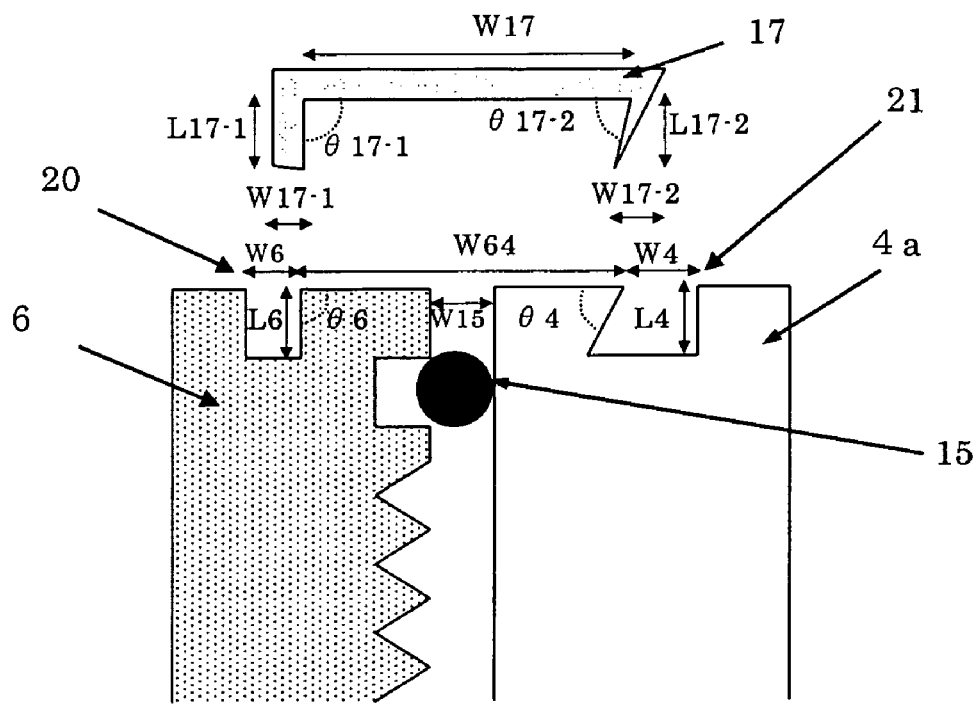
Figure 4:
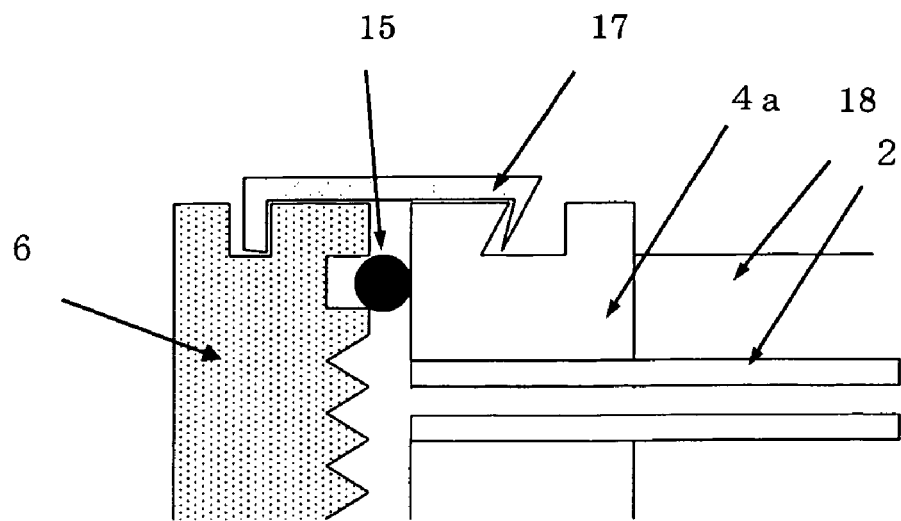

FIG. 4 schematically illustrates a simple diagram of the configuration in which a permeated fluid collector 6a and a resin 4a at one end of a hollow fiber membrane element are secured to each other with snaps 17 in engagement therebetween in one example of a hollow fiber membrane submodule of the present invention. The permeated fluid collector 6a is provided with a groove for the snap to engage in, and the resin of the hollow fiber membrane element is also provided with such a groove. The groove in the resin is acutely notched so that the snap is not easily removed. In order to achieve firm fixation, installation of the snap is done by engaging the snap first in the resin 4a, and then in the permeated fluid collector 6a. Removal of the snap can be done from the permeated fluid collector 6a side using a special jig.

Figure 5:
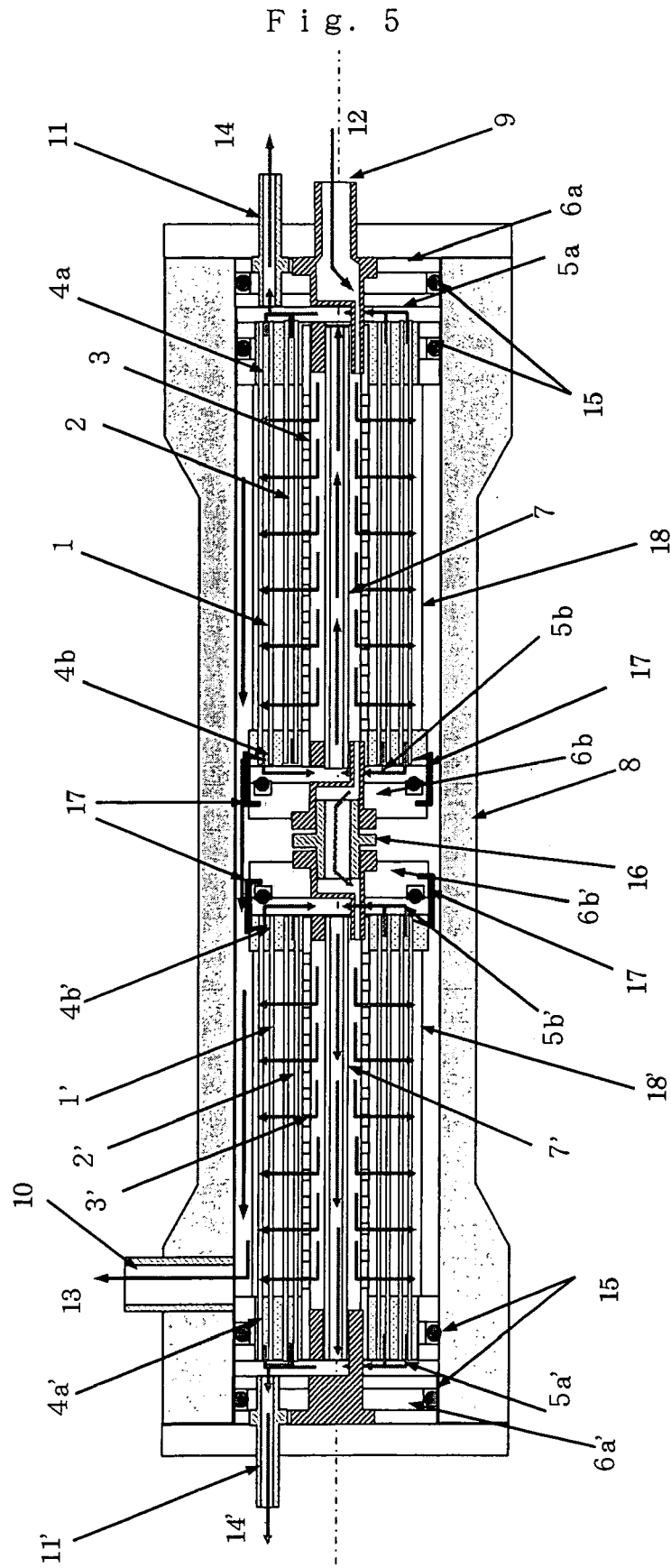

FIG. 5 illustrates a simple structural diagram of one example of a hollow fiber membrane module of the present invention comprising two hollow fiber membrane submodules connected in parallel in a pressure vessel and each having a permeated fluid collector secured to one end only. The flow of fluids and structure of each of the hollow fiber membrane submodules 1, 1' are basically similar to those of the hollow fiber membrane submodule shown in FIG. 1. The two hollow fiber membrane submodules 1, 1' are connected through an intermediate connector 16. Part of feed fluid 12 is fed to the hollow fiber membrane submodule 1, and the remainder of the fluid 12 is fed to the hollow fiber membrane submodule 11 via the intermediate connector 16. Concentrated fluids in the hollow fiber membrane submodules 1, 1' both exit from a concentrated fluid outlet 10. Permeated fluids in the hollow fiber membrane submodules 1, 1' exit from permeated fluid outlets 11, 11', respectively.

Figure 6:
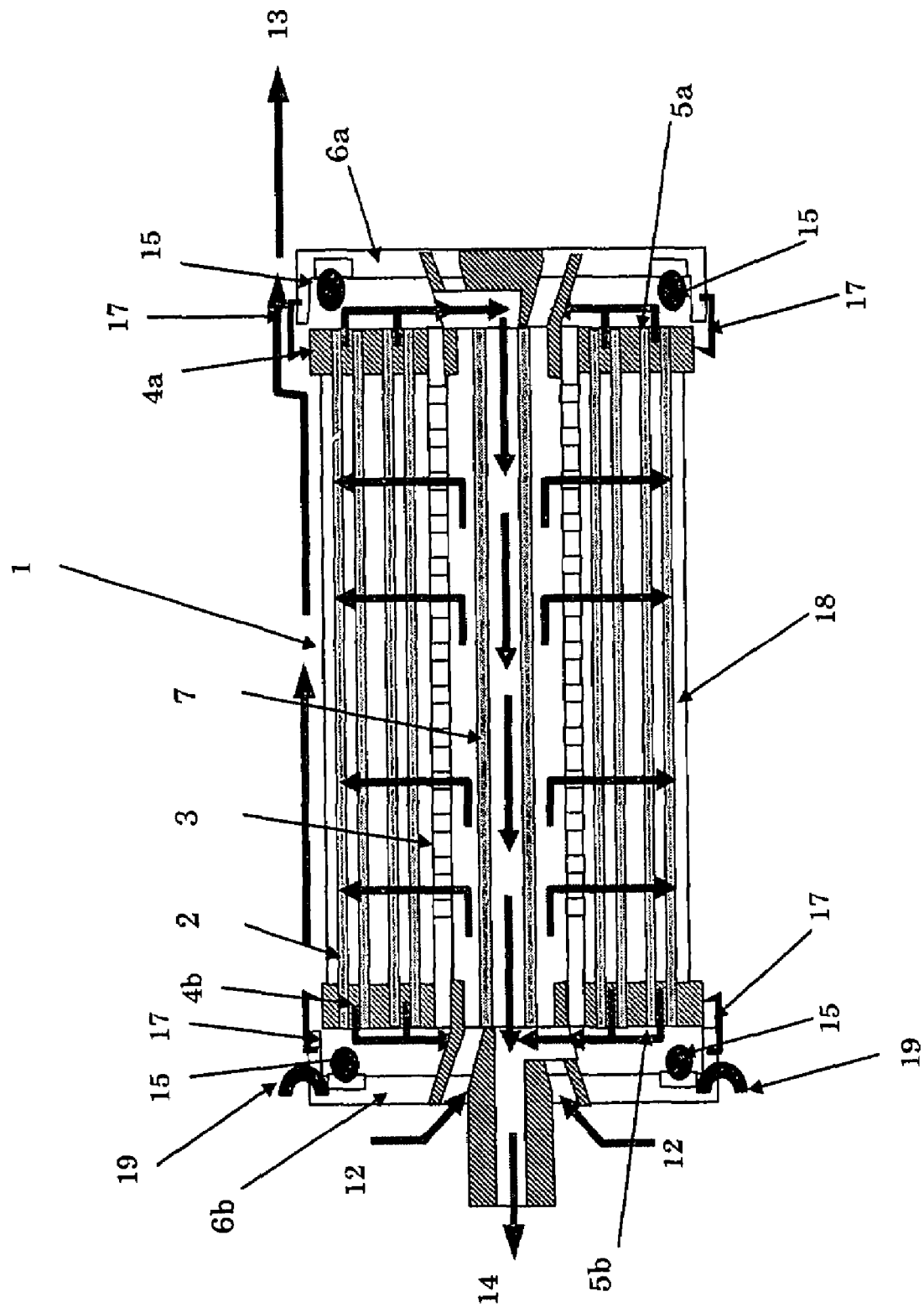

FIG. 6 shows a simple structural diagram illustrating an example of a hollow fiber membrane submodule of the present invention having permeated fluid collectors secured to both ends.

Figure 7:
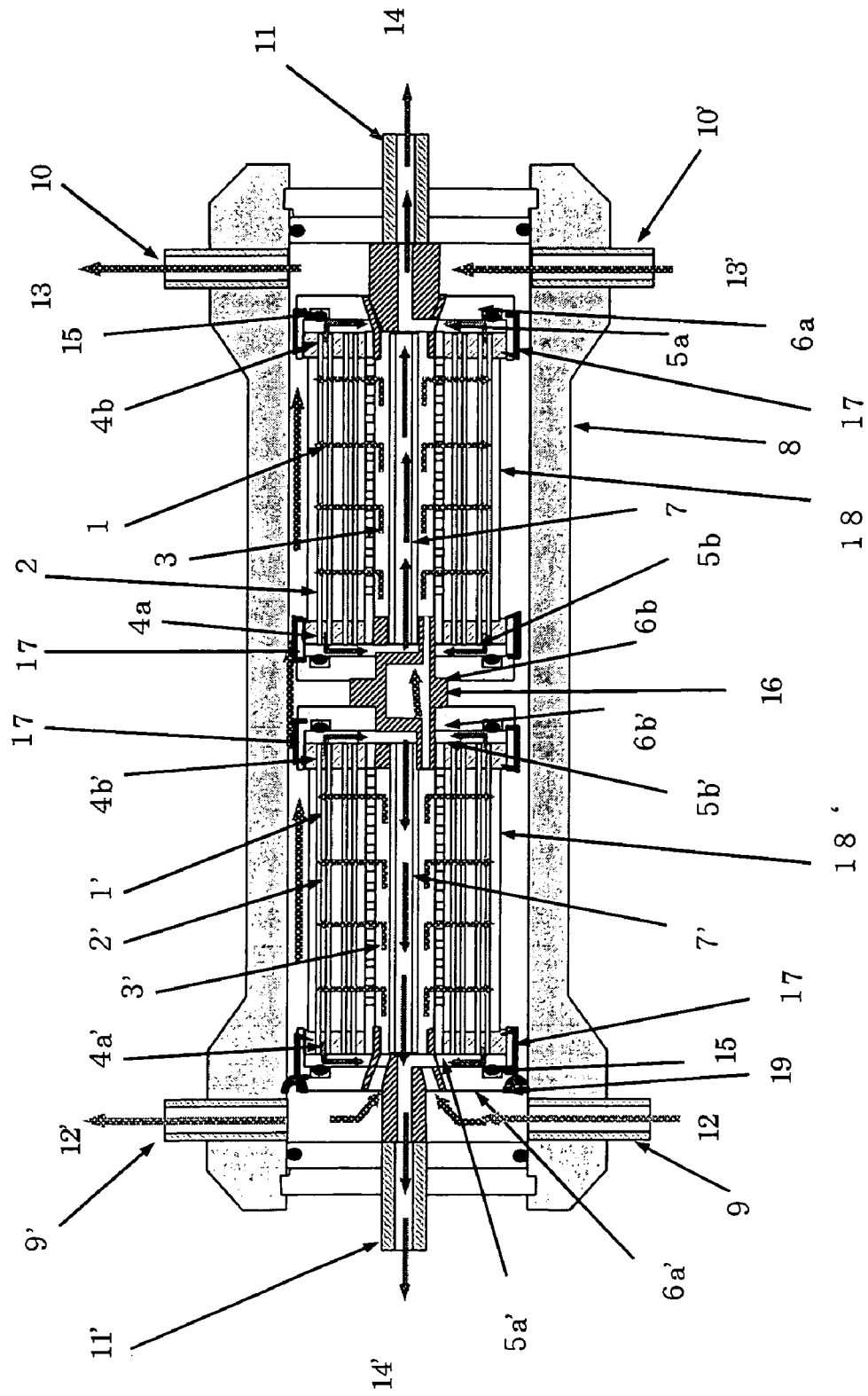

FIG. 7 is a simple structural diagram illustrating an example of a hollow fiber membrane module of the present invention comprising two hollow fiber membrane submodules in a pressure vessel, each of which has permeated fluid collectors secured to both ends.

The present invention is further illustrated by the following Examples, which are not intended to limit the scope of the disclosure. Examples illustrate cases of reverse osmosis membranes for seawater desalination.

(Measurements of Impact Strengths of Snaps)

Impact strengths of the snaps in the Examples were measured by notched impact izod tests according to ASTM D256.

(Measurements of Bending Elasticity Coefficients of Snaps)

Bending elasticity coefficients of the snaps in the Examples were measured by tests according to ASTM D790.

(Measurements of Tensile Strengths of Snaps)

Tensile strengths of the snaps in the Examples were measured by tests according to ASTM D638.

Example 1

(Fabrication of Hollow Fiber Membranes)

Forty parts by weight of cellulose triacetate (acetylation degree: 61.4) was mixed with a solution composed of 18 parts by weight of ethylene glycol and 42 parts by weight of N-methyl-2-pyrrolidone, and the mixture was heated to obtain a solution for forming membranes. The solution was degassed under reduced pressure, and then discharged from a nozzle to travel through the air into a coagulating liquid composed of 65 parts by weight of water at 14° C., 10.5 parts by weight of ethylene glycol and 24.5 parts by weight of N-methyl-2-pyrrolidone, to thereby form hollow fibers. Subsequently, the hollow fiber membranes were washed with water at room temperature to remove excess solvent and nonsolvent, and then treated with hot water. Thus, hollow fiber reverse osmosis membranes made of cellulose triacetate membranes were produced. The obtained hollow fiber membranes had an outside diameter of 137 Mm and an inside diameter of 53 µm. The desalination performance of hollow fiber membranes with an effective length of about 1 m was measured. As a result, the amount of permeated water was 61 l/m²/day, and the salt rejection ratio was 99.8%. The measurement conditions were a supply pressure of 5.4 MPa, a temperature of 25° C., a salt concentration of 3.5 wt. %, and a recovery rate of 2% or less. The salt rejection ratio is defined by the following equation:

$$\text{Rejection ratio} = (1-(\text{solute concentration in permeated water}/\text{solute concentration in feedwater})) \times 100\ (\%).$$

(Fabrication of Hollow Fiber Membrane Submodule)

Figure 8:
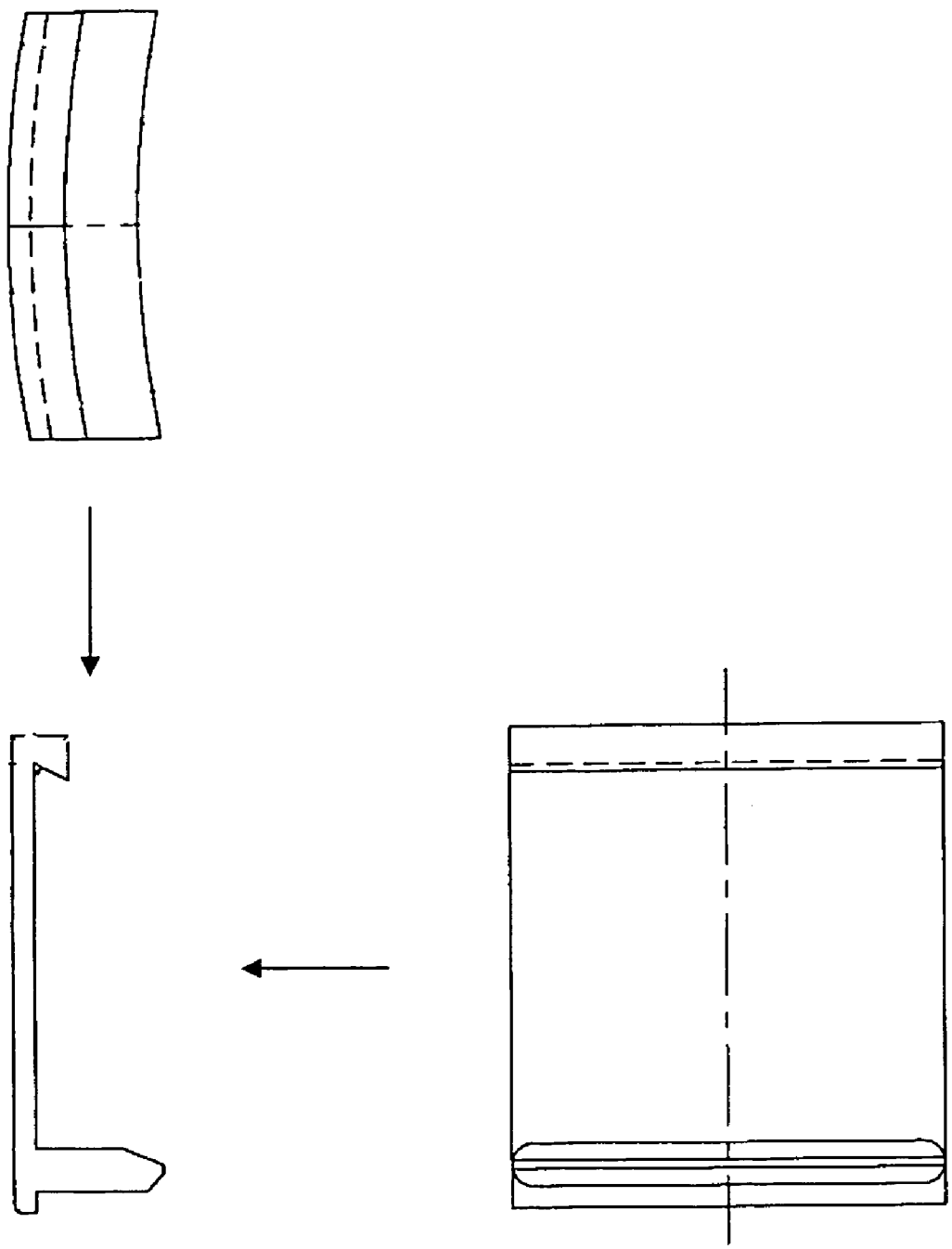

Hollow fiber membranes thus fabricated were arranged in a crisscross fashion around a feed fluid distribution pipe made of a perforated pipe, so as to form a hollow fiber membrane assembly. The crisscross arrangement of the hollow fiber membranes was accomplished by rotating the feed fluid distribution pipe to wind a hollow fiber membrane or a bundle of a plurality of hollow fiber membranes while causing the membrane or bundle to traverse the feed fluid distribution pipe in the axial direction. The outermost layer of hollow fiber membranes was angled at about 47 degrees to the axial direction. After both ends of the hollow fiber membrane assembly had been potted and fixed with an epoxy resin, the ends of the assembly were cut open to hollow out the hollow fiber membranes. An internal pipe was subsequently passed through the feed fluid distribution pipe, and then the ends thereof were fixed with permeated fluid collectors. One permeated fluid collector was secured to an end of the hollow fiber membrane element with eight snaps as shown in FIG. 3 and FIG. 4 in engagement therebetween, so as to fabricate a hollow fiber membrane submodule as shown in FIG. 2. At the other end was supported a permeated fluid collector with a connector serving as a feed fluid inlet disposed at the center. As with the permeated fluid collectors, the snaps were made of a polyacetal resin. The polyacetal resin had an impact strength of 7.6 (kg·cm/cm), a bending elasticity coeffecient of 28,700 (kg/cm²), and a tensile strength of 700 (kg/cm²). The shape of each snap was as shown in FIG. 8, i.e., an arch-like shape in the circumferential direction along the circumferential shape of the hollow fiber membrane element and permeated fluid collectors. Referring to FIG. 4, the snap projection on the hollow fiber membrane element side has an angle $\theta 17\text{-}2$ of 63 degrees, and exhibits roundness not with an acute angle but with its curved-surface configuration thereby to avoid stress concentration. The snap projection on the permeated fluid collector side has an angle $\theta 17\text{-}1$ of 90 degrees. The length L17-1 of the snap projection on the permeated fluid collector side is 15 mm, shorter than the depth L6 of 16 mm of the snap groove on the permeated fluid collector side. The length of L17-1 is longer than the length L17-2 of the snap projection on the hollow fiber membrane element side, thereby ensuring stability upon installation of the snap. The distance W17 between the snap projections is 45 mm. Where the distance W15 between the permeated fluid collector and the hollow fiber membrane element is 0.5 mm, the distance W17 is 45 mm, which is equal to the distance W64 between the snap grooves of the permeated fluid collector and the hollow fiber membrane element. When the distance W15 is reduced to zero by application of pressure, the distance W17 becomes 0.5 mm longer than the distance W64; however, a width W4 of 4 mm for the snap groove in the hollow fiber membrane element absorbs this distance, thereby preventing application of compressive stress on the snap. The permeated fluid collector has an outside diameter of 274 mm, and the pressure vessel has an inside diameter of 280 mm, resulting in a 3 mm radial gap between them. Each snap has a circumferential width of 50 mm and a thickness of 2.5 mm.

Eight such snaps were symmetrically arranged in the circumferential direction, which, upon installation of the snaps, accounted for 46% of the outer peripheral length of 876 mm with respect to the outside diameter of 279 mm. The gaps which mainly accounted for the remaining 54% defined a flow path for the concentrated fluid.

(Evaluation of Hollow Fiber Membrane Module Performance)

A single hollow fiber membrane submodule thus fabricated was installed in a pressure vessel to form a single-type module as shown in FIG. 1. A 3.5 wt % salt water having a temperature of 25° C. was fed to this module through the feed fluid inlet at an operating pressure of 5.4 MPa, and reverse osmosis treatment was carried out for measurements of permeated water flow rate, permeated water concentration and the like after an elapse of two hours. The resultant recovery rate, i.e., the ratio of the flow rate of permeated water to the flow rate of feed water to the membrane module was 30%. The salt rejection ratio was 99.5%, revealing that the permeated water was obtained from the module without mixing with the feed water or concentrated water. After the removal of the hollow fiber membrane submodule from the hollow fiber membrane module, the permeated fluid collectors were readily installed in and removed from the hollow fiber membrane submodule using a jig. Moreover, the hollow fiber membrane module was tested for back pressure resistance under a pressure of 2 $kg/cm^2$ for a back flow phenomenon likely to occur when the desalination operation of the reverse osmosis membranes has stopped. As a result, the tested snaps showed no defects.

Example 2

Hollow fiber membranes and a hollow fiber membrane element were fabricated in a similar manner to Example 1, and components such as a permeated fluid collector and the like were then attached to the hollow fiber membrane element to form a hollow fiber membrane submodule. Two such hollow fiber membrane submodules were installed in a pressure vessel with an intermediate connector therebetween. A double-type module having a parallel arrangement as that shown in FIG. 5 was thus fabricated. Reverse osmosis treatment was carried out under similar conditions to Example 1. As a result, the salt rejection ratio was 99.5%. Moreover, as in Example 1, after the removal of the hollow fiber membrane submodules from the hollow fiber membrane module, the permeated fluid collector was readily installed in and removed from each of the hollow fiber membrane submodule using a jig. Furthermore, the module was tested for back pressure resistance under a pressure of 2 $kg/cm^2$ for a back flow phenomenon likely to occur when the desalination operation of the reverse osmosis membranes has stopped. As a result, the tested snaps showed no defects.

Example 3

Hollow fiber membranes and a hollow fiber membrane element were fabricated in a similar manner to Example 1, and then a permeated fluid collector was secured to each end of the element with snaps in engagement therebetween. A hollow fiber membrane submodule as shown in FIG. 6 was thus fabricated. Two such hollow fiber membrane submodules were installed in a pressure vessel with an intermediate connector therebetween, so as to fabricate a double-type module having a parallel arrangement as that shown in FIG. 7. Reverse osmosis treatment was carried out under similar conditions to Example 1. As a result, the salt rejection ratio was 99.5%. Moreover, as in Example 1, after the removal of the hollow fiber membrane submodules from the hollow fiber membrane module, the permeated fluid collectors were readily installed in and removed from each of the hollow fiber membrane submodules using a jig. Furthermore, the module was tested for back pressure resistance under a pressure of 2 $kg/cm^2$ for a back flow phenomenon likely to occur when the desalination operation of the reverse osmosis membranes has stopped. As a result, the tested snaps showed no defects.

Comparative Example 1

Hollow fiber membranes and a hollow fiber membrane element were fabricated in a similar manner to Example 1. A permeated fluid collector was secured to one end of the element with screws. At the other end was supported a permeated fluid collector with a connector serving as a feed fluid inlet disposed at the center. One such hollow fiber membrane submodule was installed in a pressure vessel, and reverse osmosis treatment was subsequently carried out under similar conditions to Example 1. As a result, the salt rejection ratio was as low as 98.0%, and this ratio further decreased as time elapsed. When the permeated fluid collectors were removed from and installed in the hollow fiber membrane submodule as in Example 1 after the removal of the hollow fiber membrane submodule from the hollow fiber membrane module, the screws were found to have been loosened, and the permeated water in the permeated fluid collectors had mixed with the concentrated water.

Comparative Example 2

Hollow fiber membranes and a hollow fiber membrane element were fabricated in a similar manner to Example 1. A permeated fluid collector was secured to one end of the element with an adhesive. At the other end was supported a permeated fluid collector with a connector serving as a feed fluid inlet disposed at the center. One such hollow fiber membrane submodule was installed in a pressure vessel, and reverse osmosis treatment was subsequently carried out under similar conditions to Example 1. As a result, the salt rejection ratio was 99.5%. When the permeated fluid collectors were removed from and installed in the hollow fiber membrane submodule as in Example 1 after the removal of the hollow fiber membrane submodule from the hollow fiber membrane module, the removal and installation of the bonded permeated fluid collector was difficult, and the permeated fluid collector was partly damaged and was impossible to reuse.

Comparative Example 3

Hollow fiber membranes and a hollow fiber membrane element were fabricated in a similar manner to Example 1. A permeated fluid collectors was secured to each end of the element with an adhesive. Two such hollow fiber membrane submodules were installed in a pressure vessel, and reverse osmosis treatment was subsequently carried out under similar conditions to Example 1. As a result, the salt rejection ratio was 99.5%. When the permeated fluid collectors were removed from and installed in the hollow fiber membrane submodule as in Example 1 after the removal of the hollow fiber membrane submodule from the hollow fiber membrane module, the removal and installation of the bonded permeated fluid collectors was difficult, and the permeated fluid collectors were partly damaged and were impossible to reuse.

Comparative Example 4

Hollow fiber membranes and a hollow fiber membrane element were fabricated in a similar manner to Example 1. A permeated fluid collector was secured to one end of the element with two snaps as used in Examples being positioned symmetrically. During subsequent installation of the submodule in a pressure vessel, the collector easily fell off due to the force applied, and had problem with usability. In addition, the module was tested for back pressure resistance under a pressure of 2 kg/cm$^2$ for a back flow phenomenon likely to occur when the desalination operation of the reverse osmosis membranes has stopped. As a result, the tested snaps showed damage and the like, and lacked strength.

Comparative Example 5

Hollow fiber membranes and a hollow fiber membrane element were fabricated in a similar manner to Example 1. Eight snaps made of a chlorinated polyether resin and having a similar shape to those of Example 1 were fabricated, and then a permeated fluid collector was secured to one end of the element with these snaps being arranged in symmetrical positions. At the other end was supported a permeated fluid collector with a connector serving as a feed fluid inlet disposed at the center. The chlorinated polyether resin used had an impact strength of 2.2 (kg·cm/cm), a bending elasticity coefficient of 9000 (kg/cm$^2$), and a tensile strength of 380 (kg/cm$^2$). The snaps were damaged during the installation due to the poor impact strength, bending elasticity coefficient, and tensile strength.

INDUSTRIAL APPLICABILITY

The present invention provides a hollow fiber membrane submodule comprising a hollow fiber membrane element, permeated fluid collectors, and snaps for securing the permeated fluid collectors to the hollow fiber membrane element, wherein the permeated fluid collectors are closely attached to the hollow fiber membrane element with the snaps in engagement therebetween and being arranged non-continuously around the outer periphery of the permeated fluid collector, so that the permeated fluid collectors can be removed from and installed in the hollow fiber membrane element. With the hollow fiber membrane submodule of the present invention, when replacing the membranes, the hollow fiber membrane element is replaced with a new hollow fiber membrane element, and the permeated fluid collectors can be reattached to the replaced element and reused. In addition, the snaps are capable of positioning the hollow fiber membrane element at the center of the hollow fiber membrane submodule within a pressure vessel, and also defining a flow path of a concentrated fluid with their non-continuous arrangement. Consequently, the present hollow fiber membrane submodule should find a wide range of application, examples of which include desalination of seawater, desalination of brackish water, purification of wastewater, production of sterile water, production of ultrapure water, and like reverse osmosis processes; advanced water purification treatment, removal of low-molecular-weight toxic substances such as agricultural chemicals, odorants and disinfection by-product precursors, water softening treatment by removal of hardness constituents, and like nanofiltration processes; recovery of paint from electrodeposition coating wastewater, concentration and/or recovery of useful food-related materials, water purification treatment substituting for coagulation sedimentation and/or sand filtration, and like ultrafiltration processes; recovery of helium from natural gas, separation and/or recovery of hydrogen from the purge gases of ammonia plants, carbon dioxide separation in the tertiary recovery of petroleum, oxygen enrichment, nitrogen enrichment, and like gas separation processes; and other purposes. The present invention should therefore greatly contribute to industry.

The invention claimed is:

1. A hollow fiber membrane submodule installable into a pressure vessel comprising:
    a hollow fiber membrane element having a feed fluid inlet,
    a feed fluid distribution pipe in communication with the feed fluid inlet, and an assembly of hollow fiber membranes having selective permeability and disposed around the feed fluid distribution pipe, wherein both ends of the hollow fiber membrane assembly are separately fixed with resin, and at least one end of the hollow fiber membrane assembly is subsequently cut to open the hollow fiber membranes;
    permeated fluid collectors for collecting permeated fluid flowing from the opening or openings of the hollow fiber membranes; and
    removable snaps arranged non-continuously around the outer peripheral surface of the permeated fluid collector and an end of the hollow fiber membrane element, securing the permeated fluid collector to the end of the hollow fiber membrane element in which a projection on one end of a snap is engaged in a depression provided in the end of the hollow fiber membrane element, and a projection on the other end of the snap is engaged in a depression provided in the permeated fluid collector, wherein the regions of the snaps serve to secure the hollow fiber membrane element at a central position within a pressure vessel, whereas the regions without a snap serve to ensure a flow path through which a concentrated fluid can pass.

2. The hollow fiber membrane submodule according to claim 1, wherein the hollow fiber membranes having selective permeability are arranged in a crisscross fashion around the feed fluid distribution pipe in communication with the feed fluid inlet.

3. The hollow fiber membrane submodule according to claim 1 or claim 2, wherein the hollow fiber membranes are reverse osmosis membranes.

4. The hollow fiber membrane submodule according to claim 1 or claim 2, wherein the snaps are made of resin.

5. The hollow fiber membrane submodule according to claim 1 or claim 2, wherein the snaps have an impact strength of not less than 2.5 kg·cm/cm, a bending elasticity coefficient of 10,000 to 200,000 kg/cm$^2$, and a tensile strength of not less than 400 kg/cm$^2$.

6. A hollow fiber membrane module comprising two or more of the hollow fiber membrane submodules according to any of claim 1 and claim 2, in a pressure vessel.

* * * * *

UNITED STATES PATENT AND TRADEMARK OFFICE
CERTIFICATE OF CORRECTION

PATENT NO. : 7,635,428 B2
APPLICATION NO. : 10/567162
DATED : December 22, 2009
INVENTOR(S) : Marui et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 779 days.

Signed and Sealed this

Twenty-first Day of December, 2010

David J. Kappos
*Director of the United States Patent and Trademark Office*